Nov. 25, 1969    H. L. HUSTED ET AL    3,480,367

TRIAXIAL OPTICAL ALIGNMENT

Filed May 23, 1966    3 Sheets-Sheet 1

INVENTORS.
HOYT L. HUSTED
EMIL L. VAN DEVENTER
BY
Richard D. Seibel
ATTORNEY

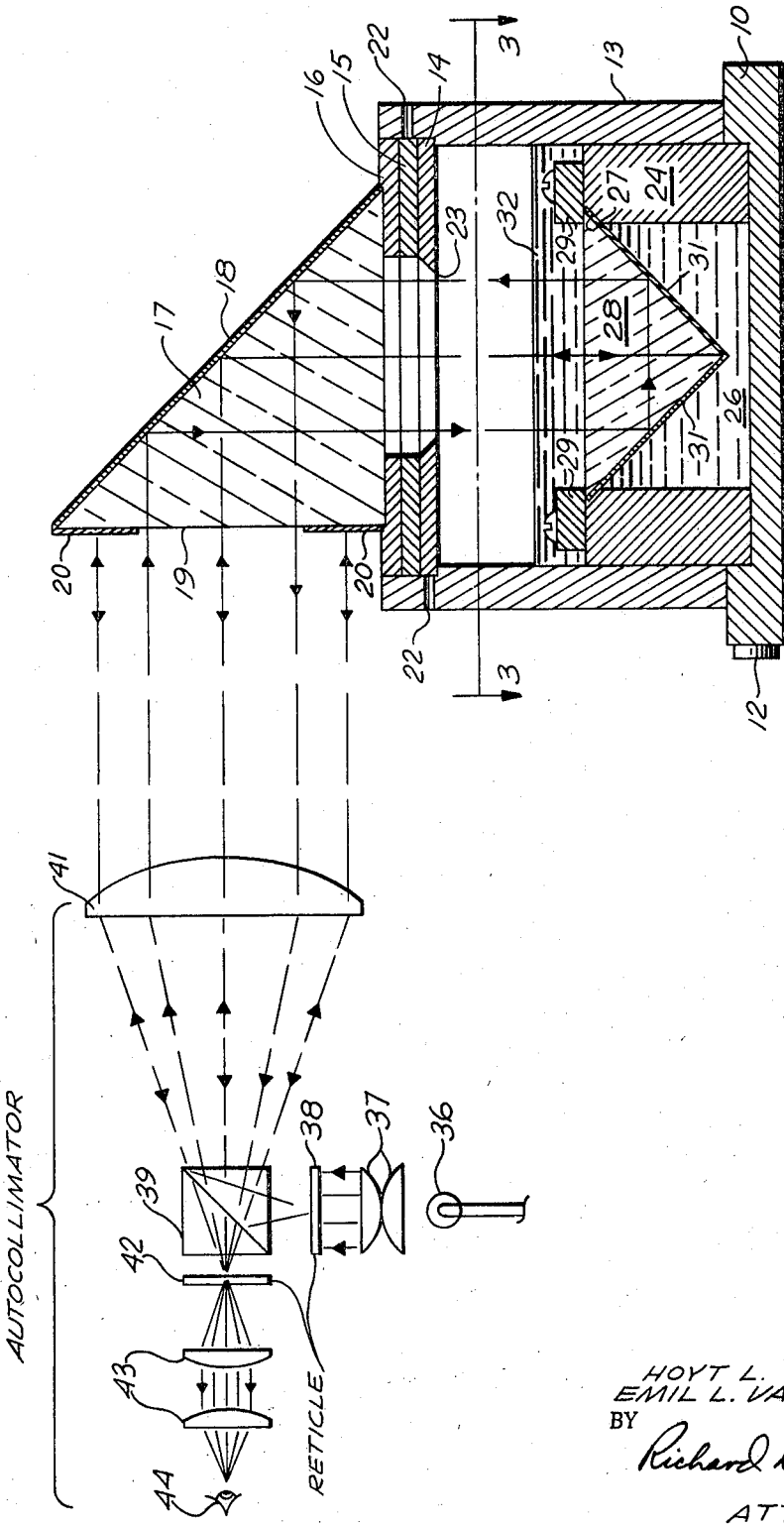

Nov. 25, 1969  H. L. HUSTED ET AL  3,480,367
TRIAXIAL OPTICAL ALIGNMENT
Filed May 23, 1966  3 Sheets-Sheet 3
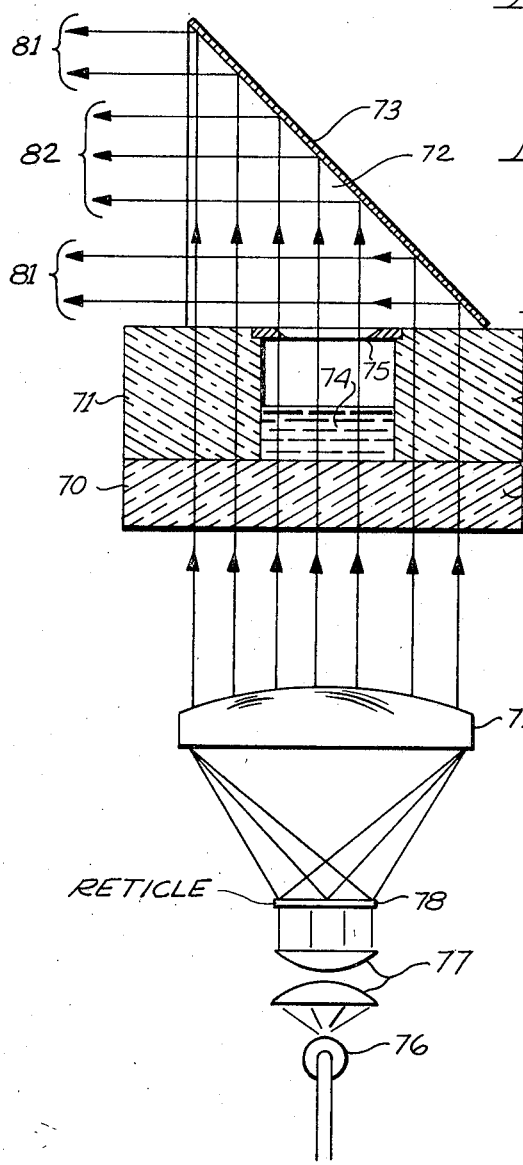
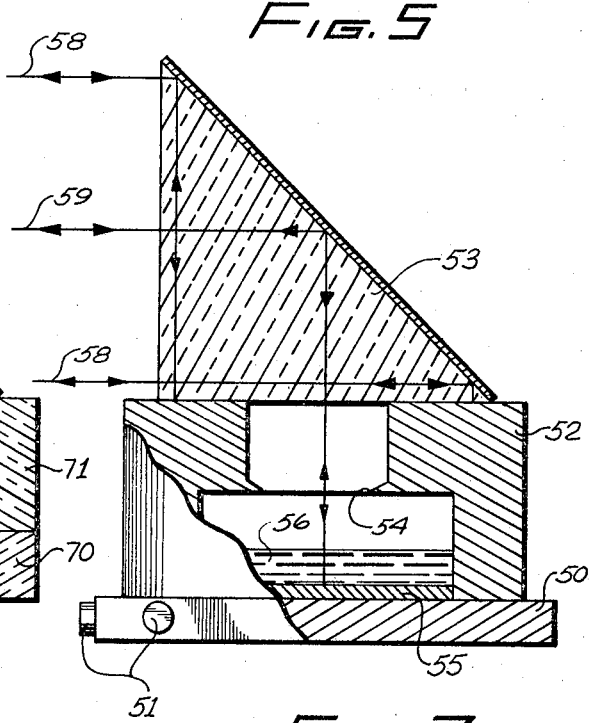
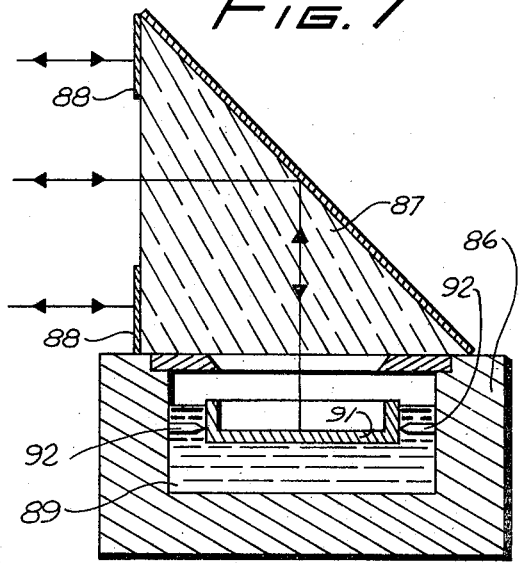
INVENTORS.
HOYT L. HUSTED
EMIL L. VAN DEVENTER
BY
Richard D. Seibel
ATTORNEY Patented Nov. 25, 1969

3,480,367
TRIAXIAL OPTICAL ALIGNMENT
Hoyt L. Husted, Downey, and Emil L. Van Deventer, Santa Ana, Calif., assignors to North American Rockwell Corporation, a corporation of Delaware
Filed May 23, 1966, Ser. No. 552,004
Int. Cl. G01b 11/26
U.S. Cl. 356—150                                         13 Claims

ABSTRACT OF THE DISCLOSURE

A precision alignment unit for obtaining angular alignment about three orthogonal axes with a single line of sight is described. In a preferred embodiment an autocollimator is employed to illuminate the instrument and measure the angular alignment. In another embodiment the information concerning alignment about the three axes is projected from the instrument. In the preferred embodiment light reflected from a surface of a prism back to the autocollimator provides information concerning alignment about two orthogonal axes normal to the line of sight between the autocollimator and the instrument. Information concerning alignment about an axis along the line of sight is provided by reflecting light through a pool of transparent liquid so that re fraction by the liquid deflects the light beam by an amount bearing a known relation to any misalignment.

The invention described herein was made in the performance of work under a NASA contract and is subject to the provisions of the National Aeronautics and Space Act of 1958, Public Law 85–568 (72 Stat. 426; 42 U.S.C. 2451), as amended.

In many locations in industry it is desirable to obtain precise alignment of tools or equipment and it has become customary to use precision optical equipment for this purpose. Thus, for example, it is necessary to align large machine tools in order to obtain high accuracy machining. It is also necessary to align guidance and navigation equipment in relation to an airframe and to earth's coordinates for precise navigation. Previously precision alignment has been obtained by optical means by mounting two mutually perpendicular mirrors on the object to be aligned and, with a precision theodolite, sighting on the two mirrors to determine their normality to the line of sight. This requires two settings of a theodolite or two separate instruments which is expensive and cumbersome and in certain instances extremely difficult because of limited access. Other alignment techniques have employed precision spirit levels and the like. Precision levels are limited in sensitivity to approximately five arc seconds over a range of only ±20 arc seconds, and are not always adaptable to complex structure.

It is therefore a broad object of this invention to provide a means for measuring rotation about three orthogonal axes with a single line of sight.

Thus, in the practice of this invention according to a preferred embodiment there is provided a triaxial alignment unit that can be connected to a machine tool or the like for alignment. Means are provided for directing two light beams along a single line of sight, the direction of one beam being responsive to rotation of the unit about a vertical axis and a horizontal axis normal to a line of sight and the direction of the other beam being responsive to rotation of the unit about a horizontal axis parallel to the line of sight. The latter responsiveness is preferably obtained by means of an orientation stabilizing device which most conveniently may be a pool of liquid that seeks a local level. A conventional autocollimator that projects the image of a lighted reticle and compares the reflected image with another reticle is employed in the practice of this invention according to a preferred embodiment. The image of the illuminated reticle from the autocollimator is projected onto the triaxial alignment unit for reflection to the autocollimator. For purposes of illustration the X axis is defined as lying along the line of sight between the autocollimator and the triaxial alignment unit, the Y axis is a horizontal axis normal to the line of sight and the Z axis is a vertical axis. The triaxial alignment unit has a front surface that is at least partially metallized for reflection of an image to the autocollimator. Any rotation of the triaxial alignment unit around the Y or Z axes produces a displacement of the image reflected from the front face and this deflection is readily measured by the autocollimator.

A portion of the front face of the triaxial alignment unit is not metallized and a portion of the light from the autocollimator enters through this area and is reflected downward by the internal reflecting face of a 45° prism. The light passes through a layer of liquid having a high index of refraction and into a Porro prism from which it is reflected exactly parallel to the direction the light entered the Porro prism. The light then passes again through the layer of liquid and is directed by the 45° prism back towards the autocollimator. Any tilt of the triaxial alignment unit around the X axis tilts the Porro prism forming the effective bottom surface of the layer of liquid but does not tilt the stable upper surfaces of the liquid which remains at the local level. Thus any tilt around the X axis creates a wedge shape in the layer of liquid which refracts the light passing therethrough. The refracted light returns to the autocollimator at an angle to the projected beam and this angle serves as a measure of the tilt about the X axis.

Thus, two images are formed in the eyepiece of the autocollimator by the triaxial alignment unit, the location of one image corresponding to Y and Z rotations as indicated by the image reflected from the front face of the triaxial alignment unit and the location of a second image corresponding to rotation about the X axis as reflected by the Porro prism through the wedge shaped layer of liquid. In the preferred and other embodiments of the invention sensitivity of ±3 arc seconds or better is obtained with rotations of up to ±4 degrees.

Thus it is a broad object of this invention to provide an optical alignment unit.

It is another object of this invention to provide a means for aligning about three axes with a single instrument and a single line of sight.

Other objects and many of the attendant advantages of this invention will be readily appreciated as the same becomes better understood by reference to the following detailed description when considered in connection with the accompanying drawings wherein:

FIG. 2 illustrates a vertical cross-section through the instrument of FIG. 1 and a schematic illustration of an autocollimator in use therewith;

FIG. 5 illustrates an alternative embodiment of a triaxial alignment unit; and

FIG. 6 illustrates an illuminated triaxial alignment unit for use with a theodolite rather than an autocollimator.

Throughout the drawings like numerals refer to like parts.

Figure 1:
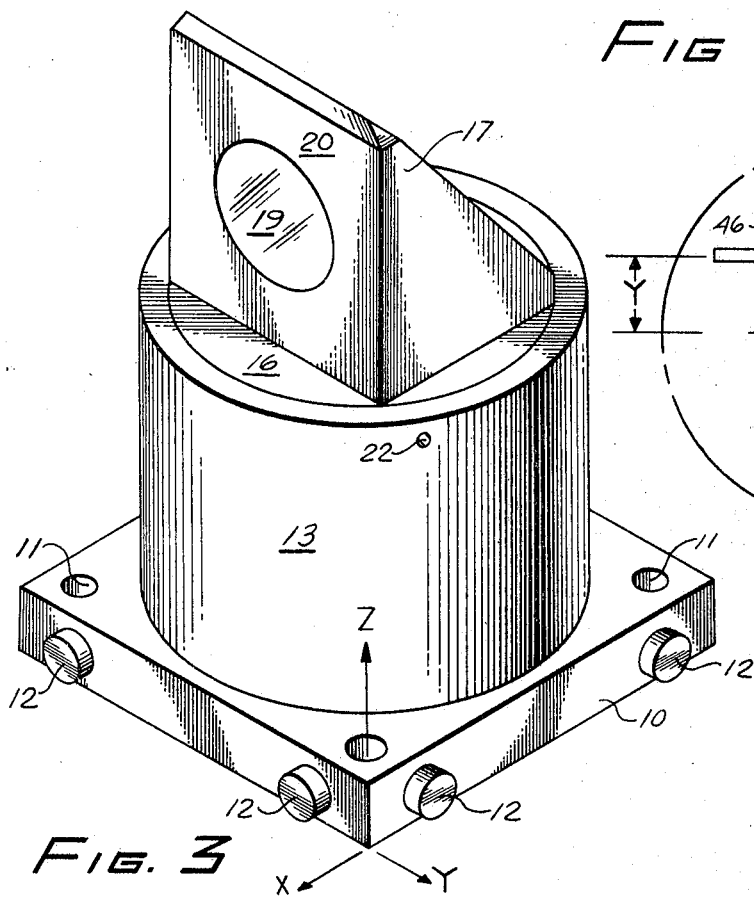
FIG. 1 illustrates a perspective view of a triaxial alignment unit constructed according to the principles of this invention.

FIG. 1 illustrates a triaxial alignment unit incorporating the principles of this invention. As illustrated in this embodiment there is provided a base 10 on which the rest of the unit is mounted. The bottom of the base 10 is smooth and flat for direct contact with a surface on a machine tool or the like to be aligned. For purposes of this discussion the base is considered as normally oriented in a horizontal plane although it will be readily appreciated that other orientations may be employed. Mounting holes 11 are provided in the base for use if it is desired to secure the unit to the item to be aligned. Contact pads 12 are provided on the edges of the base 10 for contact with other elements of the equipment to be aligned so that the orientation of the triaxial alignment unit relative to the equipment is known. The faces of the pads 12 are ground so as to be normal to the bottom of the base 10 to any desired degree of accuracy. As illustrated in FIG. 1 for purposes of discussion of the intrument, the X axis is defined as lying normal to the front of the alignment unit in a horizontal plane, that is, along a line of sight to the unit; Y is a horizontal axis normal to the X axis; and Z is a vertical axis. The faces of the pads 12 lie in the X–Z and Y–Z planes and the bottom of the base in the X–Y plane.

Mounted on the base 10 is a hollow cylindrical metal housing 13. If desired in order to minimize differential thermal expansion conditions, metal parts described herein can be made of glass. As is more clearly seen in FIG. 2 three disks 14, 15 and 16 respectively are mounted horizontally at the top portion of the housing 13. On top of the top disk 16 there is mounted a 45° prism 17 with a vertical face of the prism 17 lying normal to the X axis, that is, in the Y–Z plane. The prism 17 is conveniently cemented to the top disk 16 and the three disks are conveniently held in place by conventional clamping pads or the like (not shown), or can be cemented in place after adjustment as described hereinafter. It is also desirable in industrial applications to provide a protective cover for the prism, however, this has not been shown in the preferred embodiment in order to clarify the illustration.

The hypotenuse of the 45° prism 17 has a metallized coating 18 for high reflection of light impinging thereon. The metallized coating can be a conventional aluminum, silver, copper or gold coating in order to provide high reflectivity for directing light into and out of the unit. It is desirable in many applications that at least one of the metallized surfaces on the triaxial alignment unit be made of gold or copper and the balance of the surfaces be made of aluminum or silver so that the two images formed in the instrument as hereinafter described are of different color so that they can be readily distinguished. The front vertical surface of the 45° prism 17 has a central circular area 19 about 1¼" in diameter that is left clear and the balance of the front face has a metallized coating 20 for high reflectivity.

The disks 14 and 15 within the housing 13 are deliberately made with a slight taper so that they each form a wedge with, for example, an included angle between the two faces of about 0.05°. The outer edge of each of the disks 14–16 is knurled or milled. The disks are employed for making minor adjustments in the angle of the front face of the prism relative to the base 10 so that any slight manufacturing variations can be accommodated. In order to adjust the disks a pointed instrument is inserted into one of three access holes 22 provided through a side of the housing 13 opposite the edge of each of the disks 14–16. The point is engaged with the knurling on the periphery of the disk so that it can be rotated a slight amount. By this means the angle of the front face of the prism 17 can be correctly oriented relative to the base 10 and the pads 12 thereon. If the disks are cemented in place this adjustment must be made before the cement sets. The bottom-most disk 14 also includes a knife edge aperture 23 having the same diameter as the clear area 19 in the front face of the prism to minimize superfluous reflections.

Within the housing 13 is a support member 24 having a rectangular cavity 26 therein. A chamfer 27 is provided on two edges of the rectangular cavity, and a Porro prism 28 is mounted on the chamfer and secured to the support member 24 by clamping blocks 29. The Porro prism has a triangular cross-section with a right angle and two 45° angles. The two faces adjacent the right angle preferably have a metallized coating 31 thereon for high reflectivity, and the hypotenuse, which is in the X–Y plane, is left clear for light transmission. It will be apparent that instead of metallized surfaces on the 45° prism and Porro prism, that the index of refraction of the glass can be sufficiently high to give total internal reflection in the conventional manner.

A liquid 32 is provided within the cavity 26 and over the hypotenuse face of the Porro prism so that the Porro prism forms the effective bottom of a liquid layer. The liquid 32 is preferably clear, stable, and has a high index of refraction. Suitable liquids have been found to be fluorocarbon compounds with an index of refraction of 1.38, silicone oil with an index of refraction of 1.406, caster oil with an index of refraction of 1.494, glycerin with an index of refraction of 1.478, paraffin oil with an index of refraction of 1.4832 and safflower oil with an index of refraction of 1.591. A preferred liquid for use is a silicone oil available from the Dow Chemical Company under the trade name Dow Corning 200 with an index of refraction at ambient temperatures of 1.4058 and a viscosity of approximately 1000 centistokes. The viscosity of the fluid directly affects the response time of the unit and its suspectibility to ambient vibrations. Tests have indicated that a viscosity of 1000 centistokes provides substantial damping of vibration with a response time of less than five seconds. For other applications other liquids can be employed and compatible liquids can be blended to achieve the desired viscosity and refractive index for a particular application.

In order to obtain a flat upper surface on the liquid a depth of ³⁄₁₆" to ⅜" above the face of the Porro prism is preferred and in order to avoid effects of the meniscus, the outer one-quarter inch of the liquid should not be used. It has been found convenient to employ an aperture 23 approximately 1¼" in diameter and a pool of liquid that is at least 1¾" wide. The depth of fluid in the unit has no effect on operation so long as it is deep enough to accommodate the desired maximum tilt angle without allowing the liquid surface to contact the base of the 45° prism 17. In the triaxial alignment unit described and illustrated in FIG. 2 a substantial volume exists below the mark 14 within the housing 13 so that all of the liquid in the triaxial alignment unit can be accomodated with the unit laid on its side without bringing liquid in contact with the bottom face of the prism 17.

FIG. 2 also illustrates schematically an autocollimator for use with the triaxial optical alignment unit. The autocollimator comprises an incandescent lamp 36 or the like as a light source. A condenser lens 37 directs light from the lamp 36 so as to illuminate a reticle 38. The illuminated image of the reticle 38 is reflected by a beam splitter 39 and projected through the objective lens 41 of the autocollimator as a substantially parallel beam.

Light reflected from the triaxial alignment unit returns to the objective lens 41 of the collimator as a substantially parallel beam. This reflected image is redirected through the beam splitter 39 and a reticle 42 to the occular lenses 43 of the autocollimator where they can be studied by an observer 44.

Figure 4:
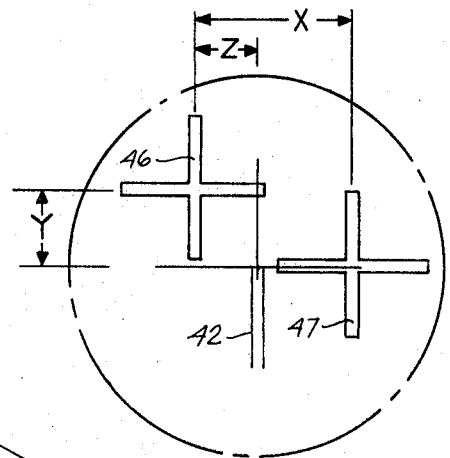
FIG. 4 illustrates a typical image in the field of the autocollimator.
Figure 3:
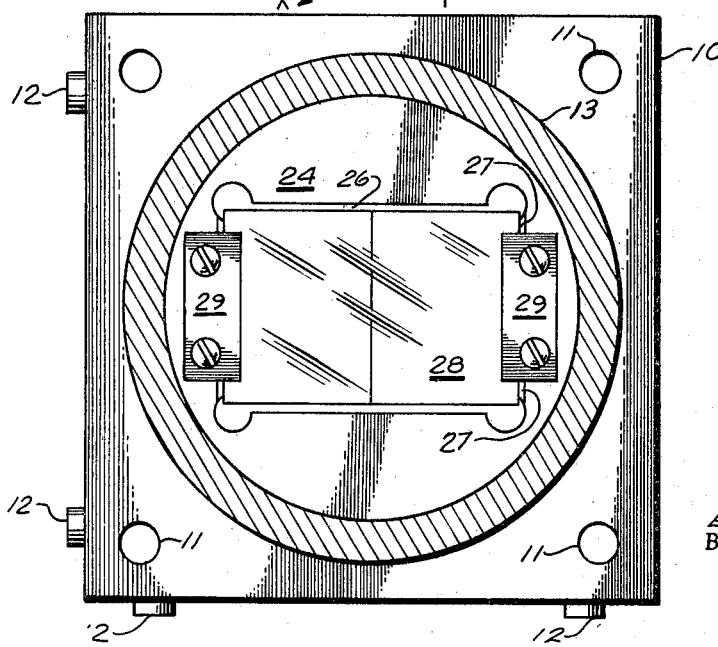
FIG. 3 is a horizontal cross-section through the instrument of FIG. 1.

The observer viewing a reflected image through the autocollimator sees the reticle 42 of the autocollimator and two reflected images 46 and 47 of the illuminated reticle 38 as illustrated in FIG. 4. The first image 46 is reflected by the metallized layer 20 on the front face of the 45° prism 17 and usually appears as the brighter of the two images, 46 and 47 respectively, because the reflection is direct from a single reflector and there is a larger surface area for reflection. The two images are normally readily distinguished because of the difference in brightness, however, if desired one of the metallized coatings in the triaxial alignment unit can be of a colored metal to impart a distinctive color to one of the two images. The second image 47 seen by the observer is the image reflected through the liquid 32 in the triaxial alignment unit. This image has passed through the clear central area 19 on the 45° prism 17, been reflected by the metallized coating 18 on the back of the prism, passed through the liquid layer 32 and reflected off of the two perpendicular faces of the Porro prism and back along a similar path as has been illustrated in FIG. 2. The second image returns to the autocollimator in a direction similar to the direction of the first image, deviating from parallel thereto according to tilt of the unit relative to the axes.

The displacement of the two images 46 and 47 provides a measure of the rotation of the triaxial alignment unit around the three axes X, Y, and Z. The first image 46 from the flat front surface of the prism 17 substantially normal to the line of sight, provides a measure of rotation of the unit around the Y and Z axes. Thus a rotation around the Y axis will shift the image 46 vertically in the field of view of the autocollimator as illustrated in FIG. 4. Similarly rotation around the Z axis will shift the image 46 horizontally in the field of view of the autocollimator as shown in FIG. 4. The amount of shift in the Y and Z directions is measured from the reticle 42 of the autocollimator. This Y and Z displacement can be measured with a Filar micrometer eyepiece or the image can be returned to coincide with the reticle 42 of the autocollimator by rotating the telescope of the autocollimator, and the angular adjustment necessary can be measured in the conventional manner from the angular readout scales of the autocollimator. As will be apparent to one skilled in the art the null type measurement where the image 46 is returned to the reticle 42 is preferred since it is more sensitive than the Filar eyepiece measurement.

The image 47 reflected through the pool of liquid 32 gives a measure of the rotation of the triaxial alignment unit around the X axis. A tilt of the unit about the X axis tilts the bottom of the liquid pool, but not the free top surface which is stabilized by gravity. The transparent liquid is thus in a wedge shape and refracts light passing therethrough in the same manner as any optical wedge, the angle of beam deflection being proportional to the index of refraction and the angle between the two faces of the wedge. This angular deflection displaces the image 47 horizontally in the field of view of the autocollimator. The amount of X axis rotation is measured between the first and second images 46 and 47 respectively rather than between the reticle 42 and the image 47 since the X axis rotation is about a line of sight normal to the front face of the triaxial alignment unit and the Z rotation indicates the position of this line of sight. The anglar deviation introduced by the liquid wedge when the triaxial alignment unit is tilted around the X axis is stated by Snell's law, $d=(n-1)A$, where $n$ is the index of refraction of the wedge, A is the angle of the wedge in degrees, i.e. the angle of tilt, and $d$ is the deviation angle in degrees. Thus, the scale factor for converting the measured displacement of the two images to the rotation of the triaxial alignment unit about the X axis equals the index of refraction of the liquid minus one. For example, with the preferred liquid having an idex of refraction of 1.4058, the scale factor is exactly .4058, that is, the angle between the two images measured at the autocollimator is .4058 times the X rotation angle at the triaxial alignment unit.

The Porro prism 28 is preferred as a reflector below the liquid 32 in order to eliminate any vertical motion of the second image. This reduces the possibility of an ambiguity in the field of view of the autocollimator and minimizes the possibility for operator error. It will be recognized that upon rotation of a triaxial alignment unit around the Y axis that a wedge is produced in the liquid layer 32. This wedge also refracts the light beam, however, the effect of this refraction is canceled by using a Porro prism for a reflector below the liquid. It is a characteristic of a Porro prism due to the right angle between the metallized faces that any light entering the prism is returned along a path exactly parallel to the path along which it entered, that is, the Porro prism is a two sided corner reflector. For this reason, the direction of the light at the interface between the Porro prism and the liquid is the same for light leaving the prism as for light entering the prism. Thus, refraction at this interface is the same amount and exactly opposite for light passing in each direction. This makes all light within the liquid traveling in parallel paths and refraction occurs in exactly the same manner for incoming and outgoing light at the interface between the liquid and the air within the alignment unit. For this reason light beams entering the clear face of the triaxial alignment unit and light beams projected therefrom remain parallel despite rotations of the unit around the Y axis and there is no vertical displacement of the second image in the field of view of the autocollimator.

A triaxial alignment unit as described and illustrated has been constructed and the precision and other conditions verified. Thus, for example, it was considered possible that, despite the Porro prism, rotations about the Y axis would create a compound liquid wedge which would cause errors in reading rotations about the X axis. Measurements of X axis tilt made with rotation around the Y axis of 40 arc minutes showed no difference over measurements made with no Y axis rotation, thereby negating any possibility of cross-coupling of Y axis rotation to the X axis. The reflected image of the illuminated reticle has a yellow color and tests have been made utilizing green, orange, red and blue filters in the optical path without causing any measurable difference in accuracy. There is some dispersion of the image passed through the liquid and the filters limit the apparent dispersion but also reduce the brightness of the image. With no filters the normally yellow image has a slight red ghost or halo as the unit deviates appreciably from the level. This tends to widen the image but no difficulty or degradation of performance has been experienced in null type readings with this slightly wider and two toned image.

A triaxial alignment unit has been mounted on a base so that known increments of tilt can be applied to the unit. A sensitive autocollimator was located approximately six feet away from the front of the prism and used to measure deflections of the parallel rays of light which are projected by the autocollimator. Over 100 readings were made with angles set into the X axis of the triaxial alignment unit, which is the least sensitive of the axes because of the scale factor. These angles were in four arc minute intervals out to a total of four degrees rotation. The data showed that an accuracy of ±5 arc seconds was obtained in over 75 percent of the readings and that all readings were accurate to within ±10 arc seconds. By carefully employing the autocollimator and repeating readings to average out operator variations, the accuracy of the instrument is at least better than ±3 arc seconds. It should be noted that with a liquid having a higher index of refraction a greater accuracy can be obtained. There is no theoretical reason that, with better fabrication techniques than in the models built, the error would not be less than the operator can detect.

FIG. 5 illustrates another embodiment of a triaxial alignment unit constructed according to the principles of this invention. The unit illustrated in FIG. 5 is somewhat simpler than the triaxial alignment unit hereinabove described and illustrated, however, a dual motion of the second image occurs when using this instrument as hereinafter described. The triaxial alignment unit illustrated in FIG. 5 comprises a base 50 with alignment pads 51 on the sides thereof for alignment to equipment such as a machine tool that is to be aligned. A metal housing 52 on the base serves as a support for a 45° prism 53 which is substantially identical to the prism 17 in the embodiment described in relation to FIG. 1.

The front vertical surface of the prism 53 is clear and the top surface of the housing 52 is highly polished to serve as a reflector as indicated by the light rays 58. Tilt of the unit around the Y axis (located the same as in FIG. 1) tilts the housing and the image reflected therefrom is deflected vertically in the field of view of the autocollimator. Similarly rotation of the unit around the Z axis will rotate the hypotenuse face of the prism and deflect the image horizontally. The accuracy of the Y and Z measurements is degraded slightly because of refraction at the front surface of the prism, but this may be acceptable to avoid use of a reflective coating on an exposed surface.

A knife edge aperture 54 in the housing 52 is below the center portion of the prism 53. At the bottom of the housing 52 there is a flat mirror 55 that serves to reflect light back toward the 45° prism 53 and out of the alignment unit as indicated by the light ray 59. A layer of liquid 56 is provided above the mirror 55 so as to form a refractive optical wedge when the triaxial alignment unit is rotated around the X axis in the same manner as in the preferred embodiment. When a flat mirror 55 is used in a triaxial alignment unit a wedge also forms upon rotation around the Y axis. This compound wedge deflects the second image from the triaxial alignment unit in a vertical direction in the field of view of the autocollimator. The vertical motion of the second image due to rotation of the unit around the Y axis is redundant with the vertical displacement of the first image and is preferably eliminated by use of the Porro prism as described in the preferred embodiment to avoid ambiguity and minimize operator errors.

FIG. 6 illustrates a third embodiment of an illuminated triaxial alignment unit. A unit of this short is usable with any precision optical instrument having a measuring reticle such as a theodolite, or if the unit is used to verify alignment, an ordinary transit can be employed. It is not necessary to project light from an autocollimator to the triaxial alignment unit illustrated in FIG. 6 which means that simpler and more economical measuring instruments can be employed. With a triaxial alignment unit as has been described hereinabove, it is preferred to use an autocollimator having a projection reticle, which limits the range of usefulness to about 100 feet between the autocollimator and the alignment unit. With a self-illuminated triaxial alignment unit as illustrated in FIG. 6 this range can be increased to 1000 feet or more.

As illustrated in FIG. 6 there is provided an all glass or fused quartz unit for measuring angular displacements. This unit comprises a transparent base 70 with two parallel sides lying in a generally horizontal plane. Mounted on the base is a circular ring 71 of transparent material and a 45° prism 72 is mounted on the ring. The hypotenuse of the prism 72 has a metallized coating 73 thereon for directing light from the unit in the manner described above. Within the cavity in the ring there is a pool of transparent liquid 74 having a relatively high index of refraction. Beneath the base 70 there is provided a collimated light source shown schematically in FIG. 6, comprising an incandescent lamp 76 for providing light, a set of condenser lenses 77 and an illuminated reticle 78. Light from the reticle 78 is collimated by a collimating lens 79 and directed through the base 70. A portion of the light bearing an image of the reticle 78 passing through the base also passes through the ring 71 and is reflected by the prism 72 as indicated by the light rays 81 in FIG. 6. Another portion of the light also bearing an image of the reticle 78 passes through the liquid 74 and is reflected by the prism 72 as indicated by the light rays 82. A limiting aperture 75 occults the edges of the pool of liquid to avoid any effect of the meniscus.

Light passing through the ring 71 and reflected by the prism 72 behaves exactly the same as if the light were directed from a light source on a horizontal axis normal to the front face of the prism. Thus any rotation of the alignment unit around the Y axis will cause this image to shift in a vertical direction. Similarly rotation around the Z axis will cause a horizontal shift in this image of the reticle as viewed by an operator of a measuring instrument.

Light passing through the liquid in the alignment unit is refracted by the liquid wedge formed by rotation of the unit around the X or Y axes. Rotation around the Y axis gives a redundant vertical displacement of the second image and in using the instrument this displacement is ignored and measurement of Y rotation is normally wide with the first image. The optical wedge formed in the X direction deflects the second image horizontally in the same manner as previously described and provides a measure of rotation of the unit around the X axis. A self-illuminated triaxial alignment unit is employed in exactly the same manner as the preferred embodiment with the unit attached to or placed on an object to be aligned. It will be apparent that although the schematic illustration of FIG. 6 does not contain a housing for the collimated light source that one is readily provided with alignment pads thereon. In constructing such a unit the light beam passing through the base is aligned so as to be normal to the base. The only difference in operation of the self-illuminated unit is that a more economical measuring instrument such as a theodolite can be used therewith instead of an autocollimator, and the range of the instrument is increased. It will also be apparent that the entire unit can be built and operated in a position inverted from the position illustrated. This places the liquid pool in contact with one face of the prism 72 rather than the base 70.

FIG. 7 illustrates another embodiment of a triaxial alignment unit having reflective surfaces sensitive to rotations about three orthogonal axes. In this embodiment there is a housing 86 having a 45° prism 87 mounted thereon. The front surface of the prism 87 has a metallized coating 88 thereon for reflection of an autocollimator image in the same manner as described in the preferred embodiment. A pool of liquid 89 with a viscosity of about 1000 centistokes is provided in the housing 86 and a mirror 91 is floated on the liquid to provide a surface stabilized despite tilts of the unit. A spider of three or four pins 92 is provided between the housing and the mirror. The pins 92 are fixed to the housing and have a point adjacent the mirror so that the mirror is kept in the center of the pool of liquid to avoid meniscus problems adjacent the edges. It will be apparent that other mirror center arrangements can be employed such as axial pins, liquid bearings and the like.

Light entering the clear face of the prism is reflected downward at the rear face of the 45° prism to the mirror 91 where it is reflected back along a similar path. The mirror floating on the liquid maintains a level surface despite tilt of the unit and light reflected therefrom gives a measure of rotation of the unit about the X axis. A triaxial alignment unit employing a floating mirror is advantageous since no scale factor is needed for the X axis measurement, that is, there is a one to one correspondence between rotation of the unit about the X axis and the angle measured at the autocollimator. Offsetting this advantage in some situations is the redundant displacement of the second image vertically by rotation about the Y axis and decreased precision due to slight hysteresis in mirror motion relative to the mirror centering devices. Such a unit is also less rugged than the preferred unit because of the solid object floating in the liquid and the possibility of damage therefrom. It will be apparent that the surface of a reflective liquid such as mercury or a mirror mounted on a gimbaled pendulum could also be used as an element stabilized to maintain orientation independent of angular displacement of the unit.

Obviously many modifications and variations of the above invention are possible in light of the above teachings. It is therefore to be understood that within the scope of claims the invention may be practiced otherwise than as specifically described.

What is claimed is:
1. An optical instrument comprising:
a housing;
first means in said housing for directing a first beam of light from the instrument along an axis in a direction having known relations to attitude of said housing relative to first and second orthogonal axes;
second means in said housing for directing a second beam of light along an axis in a direction having a known relation to attitude of said housing relative to a third axis substantially orthogonal to both said first and second axes;
means in said housing for directing the second beam of light from the instrument in a direction substantially coincidental and coaxial with the direction of the first beam of light.
2. An optical instrument as defined in claim 1 wherein said second means comprises:
a pool of liquid in said housing; and
means responsive to the attitude of said housing relative to a surface of said pool of liquid for directing said second beam of light from the instrument.
3. An optical instrument as defined in claim 2 wherein said means for directing the second beam comprises a reflective surface associated with one surface of said pool of liquid.
4. An optical instrument as defined in claim 2 wherein said means for directing said second beam of light comprises:
a mirror floating on said pool of liquid; and
means for preventing said mirror from approaching the edge of said pool of liquid.
5. An optical instrument as defined in claim 2 wherein said liquid is a transparent liquid with a high index of refraction; and wherein
said means responsive to attitude comprises means for passing the second beam of light through said liquid between the upper and lower surfaces thereof so that the light can be refracted by said liquid; and
means for directing the second beam of light from the instrument.
6. An optical instrument as defined in claim 5 wherein said first axis is vertical and said second and third axes are horizontal and said means for directing the first and second beams of light comprise:
a prism mounted on said housing and having a first substantially vertical face, a second substantially horizontal face, and a third face at 45 degrees to the horizontal and vertical faces, said third face totally reflecting light between said horizontal and vertical faces.
7. An optical instrument as defined in claim 6 further comprising:
a reflective surface on only a portion of one of the first and second faces of said prism.
8. An optical instrument as defined in claim 7 further comprising a reflective surface below said pool of liquid for reflecting light passing through said pool of liquid back through said pool of liquid.
9. An optical instrument as defined in claim 8 wherein said reflective surface below said pool of liquid comprises:
a Porro prism having its hypotenuse face forming a surface for said pool of liquid so that light passing through said pool of liquid is reflected in a parallel path through said pool of liquid.
10. An optical instrument as defined in claim 6 further comprising:
means on said housing for aligning the instrument with a reference;
a Porro prism mounted in said housing having its hypotenuse face forming a lower surface for said pool of liquid so that light passing through said pool of liquid is reflected in a parallel path through said pool of liquid;
a reflective surface on a peripheral portion of the vertical face of said prism, so as to leave clear a central circular region on the face; and
an aperture between the horizontal face of said prism and said pool of liquid.
11. An optical instrument as defined in claim 10 further comprising:
a plurality of circular disks in said housing for mounting said prism thereon, at least two of said disks having a slight taper; and
means for rotating said disks relative to said housing for orienting said prism relative to said means for aligning.
12. An optical instrument as defined in claim 6 wherein said housing is transparent and further comprising:
an illuminated reticle; and
means for projecting an image of said reticle through said transparent housing so that a portion of the light forms the second beam of light passing through said pool of liquid and another portion of the light forms the first beam of light traveling in substantially the same direction as the second beam of light.
13. An optical instrument as defined in claim 12 further comprising:
a light source;
a condenser lens for concentrating light from said light source on said illuminated reticle;
a limiting aperture in the path of the second beam of light for occulting a portion of said pool of liquid; and wherein
said means for projecting comprises a collimating lens so that the first and second beams of light are each collimated.

References Cited

UNITED STATES PATENTS

| 1,563,483 | 12/1925 | Grossmann | 88—2.2 |
| 2,707,898 | 5/1955 | Horsfall. | |

RONALD L. WIBERT, Primary Examiner

T. R. MOHR, Assistant Examiner

U.S. Cl. X.R.

356—138